United States Patent [19]
Breeuwer et al.

[11] Patent Number: 5,182,645
[45] Date of Patent: Jan. 26, 1993

[54] APPARATUS FOR DERIVING A COMPATIBLE LOW-DEFINITION INTERLACED TELEVISION SIGNAL AND OTHER COMPONENTS FOR RECONSTRUCTING THE ORIGINAL SIGNAL FROM AN INTERLACED HIGH-DEFINITION TELEVISION SIGNAL

[75] Inventors: Marcel Breeuwer; Peter H. N. De With, both of Eindhoven, Netherlands

[73] Assignee: U.S. Philips Corporation, New York, N.Y.

[21] Appl. No.: 714,284

[22] Filed: Jun. 12, 1991

[30] Foreign Application Priority Data

Jul. 11, 1990 [EP] European Pat. Off. ........ 90201878.7

[51] Int. Cl.⁵ .................. H04N 7/04; H04N 7/12; H04N 7/00
[52] U.S. Cl. ........................... 358/141; 358/138
[58] Field of Search ............... 358/141, 12, 142, 138, 358/133, 160, 167; 364/724.1, 724.01

[56] References Cited

U.S. PATENT DOCUMENTS

| | | | |
|---|---|---|---|
| 4,766,494 | 8/1988 | Doyle | 358/140 |
| 4,815,023 | 3/1989 | Arbeiter | 364/724.01 |
| 4,817,182 | 3/1989 | Adelson et al. | 358/141 |
| 4,829,378 | 5/1989 | LeGall | 358/160 |
| 4,918,524 | 4/1990 | Ansari et al. | 358/133 |
| 5,021,882 | 6/1991 | Schreiber | 358/141 |

Primary Examiner—James J. Groody
Assistant Examiner—S. Metjahic
Attorney, Agent, or Firm—Michael E. Marion

[57] ABSTRACT

Apparatus for deriving a compatible low-definition interlaced television signal and other components for restructuring the original signal from an interlaced high-definition television signal. The HDTV signal is divided into four component signals by horizontal and vertical low-pass and high-pass QMF filtering. For the vertical filtering, one field of a frame is filtered by an odd-length filter, the other field by an even-length filter. A time delay of one sample is introduced before the high-pass odd-length QMF filter. The component signals are each subsampled by a factor of two after filtering. The component signal covering the low-frequency horizontal and low-frequency vertical range is a reduced definition interlaced TV signal. To reconstruct the original HDTV signal, all four component signals are upsampled and filtered and a one sample delay is introduced following the low-frequency odd-length filter.

15 Claims, 5 Drawing Sheets

APPARATUS FOR DERIVING A COMPATIBLE LOW-DEFINITION INTERLACED TELEVISION SIGNAL AND OTHER COMPONENTS FOR RECONSTRUCTING THE ORIGINAL SIGNAL FROM AN INTERLACED HIGH-DEFINITION TELEVISION SIGNAL

FIELD OF THE INVENTION

The present invention relates to digital processing for splitting an interlaced high definition television signal into an interlaced component signal having a horizontal and vertical definition compatible with present standards such as NTSC, PAL, or CCIR 601 and one or more auxiliary signals for recording or other types of signal transmission, so that the original signal can be reconstructed.

BACKGROUND OF THE INVENTION

Many systems and methods have been proposed for splitting a high definition television signal into two or more parts, one of which is compatible with present day standards. Many of these systems concern themselves with analog processing and bandwidth limitations to allow transmission over existing communication channels. The present invention, however, concerns itself with digital processing of the high definition television signal, mainly for recording purposes, although its application to other types of transmission such as broadcasting is not to be excluded.

The proposed method and apparatus utilize quadrature mirror filtering, a technique which in itself is known.

SUMMARY OF THE INVENTION

It is an object of the present invention to furnish a method and apparatus for splitting an interlaced high-definition television signal into parts including an interlaced TV signal having the lower definition satisfying present day standards and at least one auxiliary signal, to allow subsequent reconstruction of the high-definition television signal.

It is a further object of the present invention to accomplish the above-described goal without increasing the number of bits to be recorded relative to the number of bits in the original HDTV signal. Thus the number of compatible television samples when added to the number of samples of all of the auxiliary components should not exceed the number of samples in the original high definition television signal. Coding of the compatible and the auxiliary signals to reduce the number of samples is not the subject of this invention. Many such processes are known. For example, the coding in EP 0 341 780 A1 could be used.

The present invention is characterized in that high-frequency and low-frequency horizontal and vertical filters filter the high-definition television signal to create a first, second, third and fourth auxiliary signals covering, respectively, a first, second, third and fourth horizontal/vertical frequency range, the first, second, third and fourth horizontal/vertical frequency ranges together constituting the frequency range of said high-definition television signal, and in that subsampling means connected to the filter means to subsample each of the auxiliary signals so that the sum of samples per field of all auxiliary signals does not exceed the number of samples per field of the high-definition television signal.

Specifically, the filters are quadrature-mirror filters.

Additional features and advantages of the present invention will be described below with reference to the drawing.

DESCRIPTION OF PREFERRED EMBODIMENTS

Although a wide range of sampling frequencies, aspect rations, etc. can be accommodated by the present invention, the digital HDTV signal for the embodiment illustrated herein is assumed to have the following format. It consists of a luminance component (Y) and two color-difference components (U and V). The Y component is sampled at 54 MHz, the U and V components both at 27 MHz. The aspect ratio is 16:9. The signal has a frame rate of 25 Hz, each frame consists of two interlaced fields, and each field contains 576 active lines with 1440 active Y samples, 720 U and 720 V samples. Each sample is represented with 8 bits. Then, 664 Mbit/s are required to represent the whole HDTV signal.

The high-resolution interlaced HDTV signal must be split into an interlaced TV signal and some auxiliary signals. The interlaced TV signal should have half the number of lines and half the number of samples per line of the corresponding HDTV signal values and should have sufficiently high picture quality. Furthermore, it should be possible to reconstruct the HDTV signal with the original quality from the interlaced TV signal and the auxiliary signals.

Figure 1:
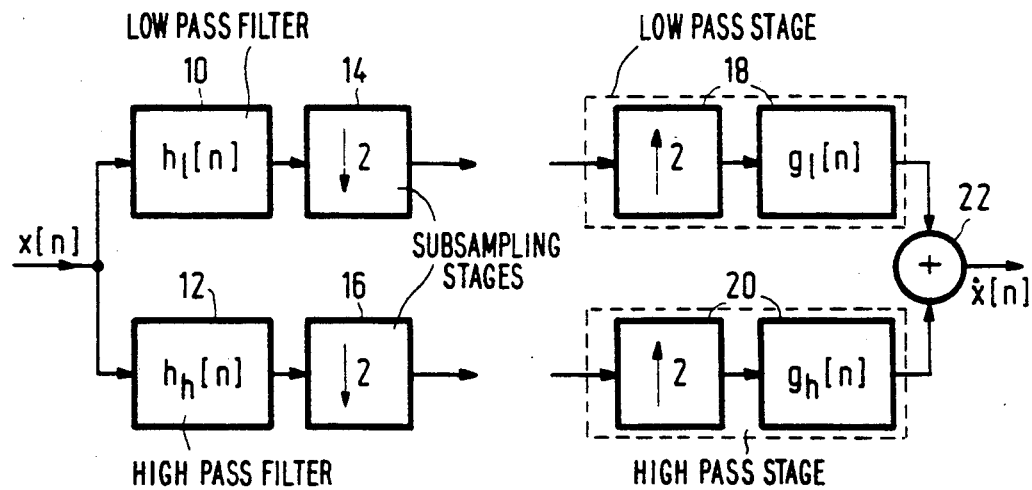
FIG. 1 is a block diagram illustrating the basic scheme of subband filtering.

The technique of subband filtering, as described, for example in "Multirate Digital Processing" by Ronald E. Crochiere and Lawrence Rabiner, pages 376-386, is especially suited for of a high-resolution picture into a low-resolution version and auxiliary information. FIG. 1 illustrates the basic scheme of a subband filter The input signal x(n) is divided into a low-pass and a high-pass filtered signal, each having half the bandwidth of the input signal, by a low-pass filter 10 and a high-pass filter 12, respectively. Subsequently, each of these signals is subsampled by a factor of 2 by respective subsampling stages 14 and 16. The resulting component signals are recorded and/or transmitted by other techniques such as broadcasting. A reconstruction $\hat{X}(n)$ is obtained by upsampling and subsequent filtering of the component signals in low-pass stage 18 and high-pass stage 20, respectively, the resulting signals being added in an adder 22. The signal at the output of adder 22 is the reconstructed signal which, with properly chosen filters, is a close replica of the input signal.

Figure 2:
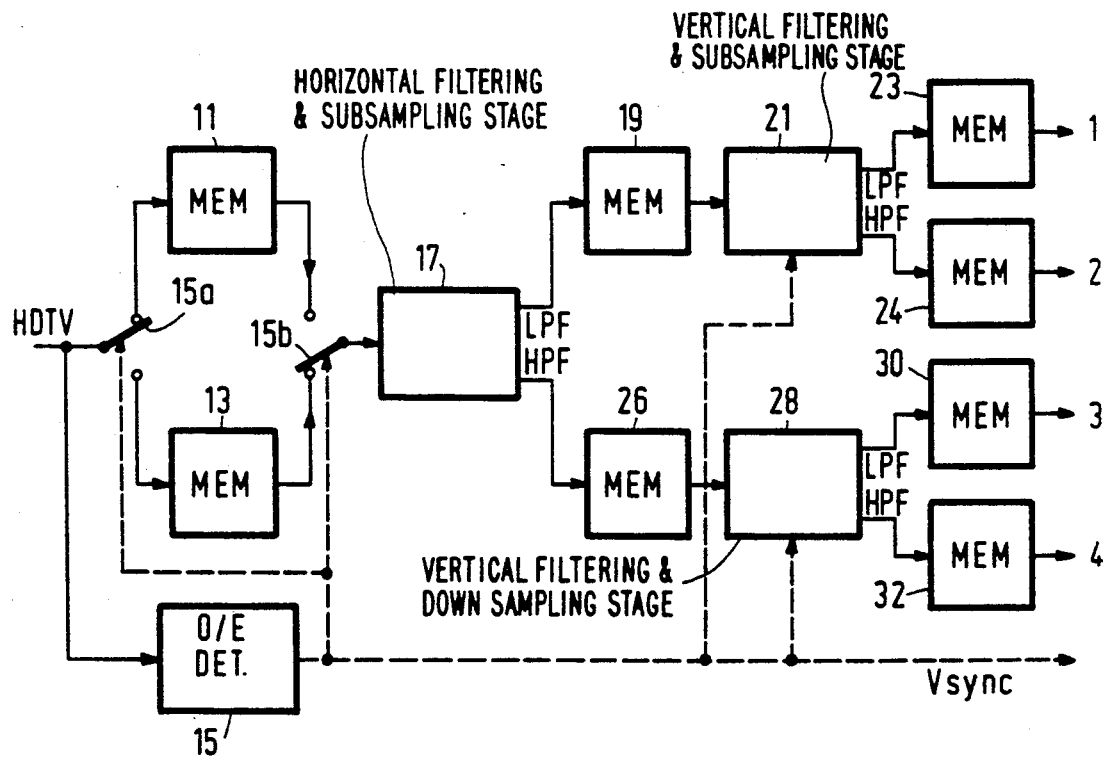
FIG. 2 is a block diagram illustrating the apparatus for splitting an HDTV field in accordance with the present invention.

The high-definition television (HDTV) picture is split into a lower resolution interlaced TV signal (compatible signal) and three auxiliary component signals by applying the filtering scheme of FIG. 1 both horizontally and vertically. As illustrated in FIG. 2, the fields of the HDTV picture are stored in respective memories 11 and 13 under control of a switch 15a. Use of field memories is assumed for ease of explanation only. Switch 15a and a switch 15b, which controls read out from the memories, both receive control signals i.e. vertical synchronization signals from an odd/even field detector 15 to which the HDTV signal is applied. The output of switch 15b is applied to a horizontal filtering and subsampling stage 17. The low-frequency output of stage 17 is applied via a memory 19 to a vertical filtering and subsampling stage 21. The low-frequency ouptut of stage 21 is the interlaced television signal. This is stored in a memory 23. The high-frequency output of stage 21 is the first auxiliary signal and is stored in a memory 24.

The high-frequency component output of stage 17 is applied to a vertical filtering and down sampling stage, 28, via a memory 26. The low-frequency component output of stage 28 constitutes the second auxiliary signal and is stored in a memory 30. The high-frequency component output of stage 28 is stored in a memory 32 and constitutes the third auxiliary signal.

Figure 3:
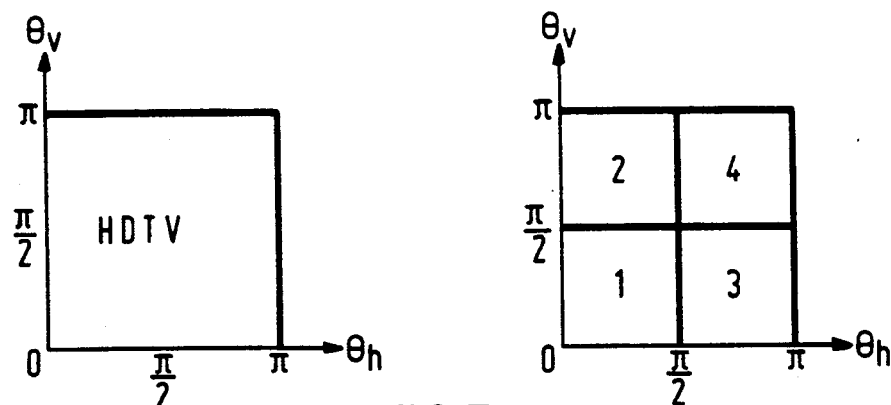
FIG. 3 shows the spatial frequency plane of the original and the split HDTV field, according to the present invention.

FIG. 3 illustrates the above-described process in the frequency domain. The high-definintion television signal spectrum is illustrated on the left-hand side of FIG. 3, $\theta_h$ being the horizontal spatial frequency, while $\theta_V$ is the vertical spatial frequency. The spatial frequency ranges associated with each of the components derived in accordance with FIG. 2 are illustrated on the right-hand side of FIG. 3. It will be noted that the compatible picture is in the low-frequency area both in the horizontal and in the vertical direction, i.e. box 1. Boxes 2, 3, and 4 represent the frequency ranges of the first, second and third auxiliary signals, respectively.

Figure 4:
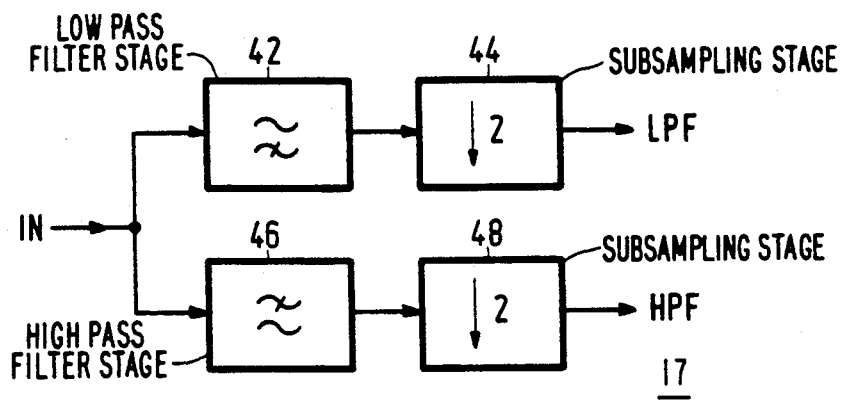
FIG. 4 is a block diagram showing the horizontal splitting and subsampling unit of FIG. 2 in greater detail.

Horizontal splitting and subsampling unit 17 is shown in greater detail in FIG. 4. It consists of a low-pass filter stage 42, followed by a subsampling stage 44. The latter subsamples by a factor of 2. Similarly, a high-pass filter stage 46 is followed by a subsampling stage 48. The latter also subsamples by a factor of 2.

One constraint for obtaining a high-quality compatible picture is that the low-pass filter in the splitting unit have a linear phase characteristic. This can be realized by using a symmetric Finite-Impulse Response (FIR) filter. A subband filtering technique that uses symmetric FIR low-pass filters is that of Quadrature-Mirror Filtering (QMF). This technique is well-known and described, for example, in the reference cited above. An example of a specific filter for horizontal filtering and subsampling will be described below.

In the same reference it is proven mathematically, that even-length FIR filters are required to allow accurate reconstruction of the HDTV picture from its components.

However, a problem arises with the compatible interlaced picture when even length filters are applied to both fields of the high-definition television signal for vertical filtering. This is illustrated in FIGS. 5a and 5b.

Figures 5A, 5B:
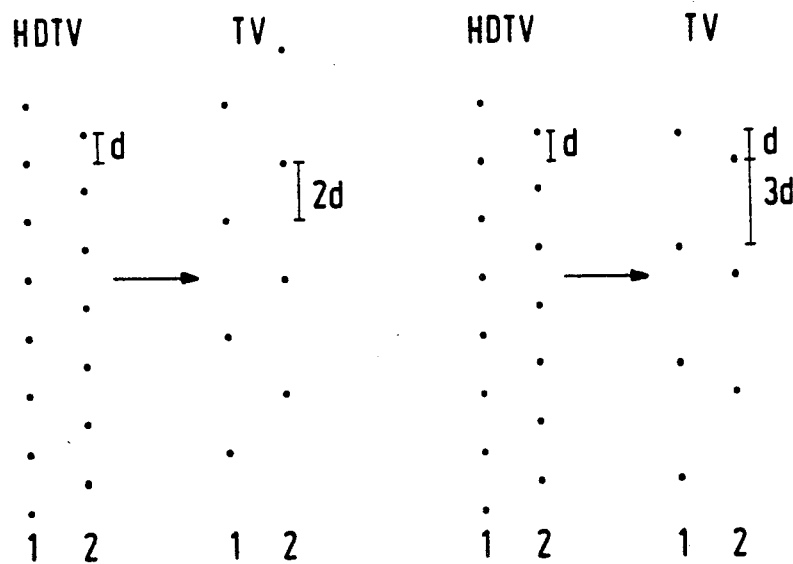
FIG. 5 is a diagram illustrating, in FIG. 5a, the required conversion from HDTV to compatible TV, and, in FIG. 5b, the conversion result with even-length quadrature-mirror filtering.

In FIG. 5a, each dot represents a line in the interlaced HDTV frame. The lines of field 1 are on the left-hand side, those of field 2 on the right. The vertical distance between sequential lines of each field is 2d, the lines of field 2 being situated, vertically, at spacings d from the corresponding lines in field 1. The compatible signal, on the other hand, must have a spacing of 4d between adjacent lines. Also, the scanning system of the standard TV which will receive the compatible signal will position the lines of field 2 halfway between corresponding lines in field 1. This is the required conversion illustrated in FIG. 5a.

However, application of the signals of both fields to even length filters and subsampling by a factor of 2 will create the pattern of FIG. 5b, namely the lines of field 2 will not be midway between the corresponding lines of field 1. The standard TV scanning system will thus utilize pixel values for the lines of field 2 which do not correspond to the actual scanning location on the compatible picture. This introduces artifacts which can not be tolerated.

Figure 6:
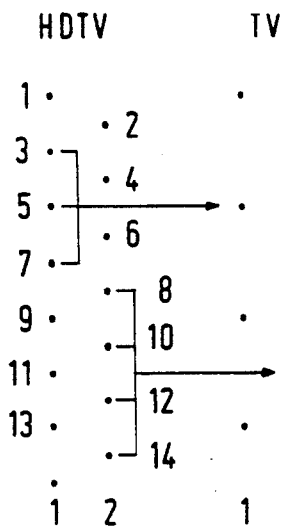
FIG. 6 is a diagram illustrating the filtering scheme for the HDTV picture which creates the interlaced component signal.

These artifacts can be eliminated, as shown in FIG. 6, by using an odd length filter for field 1 and an even length filter for field 2, irrespective of whether field 1 is the even or the odd field. It will be noted that the weighted averages generated by the odd and even length filters will always be the values at the correct position for interlacing, if the correct phase relationship between the two filters is maintained. Thus, in FIG. 6, if the filter of length 3 processes lines 3, 5, 7; 7, 9, 11; etc.. The filter of length 4 processing field 2 must process lines 4, 6, 8, 10; 8, 10, 12, 14; etc, i.e. the axis of symmetry of each of the two filters moves a distance 4d in the vertical direction with each filter step.

Figure 7:
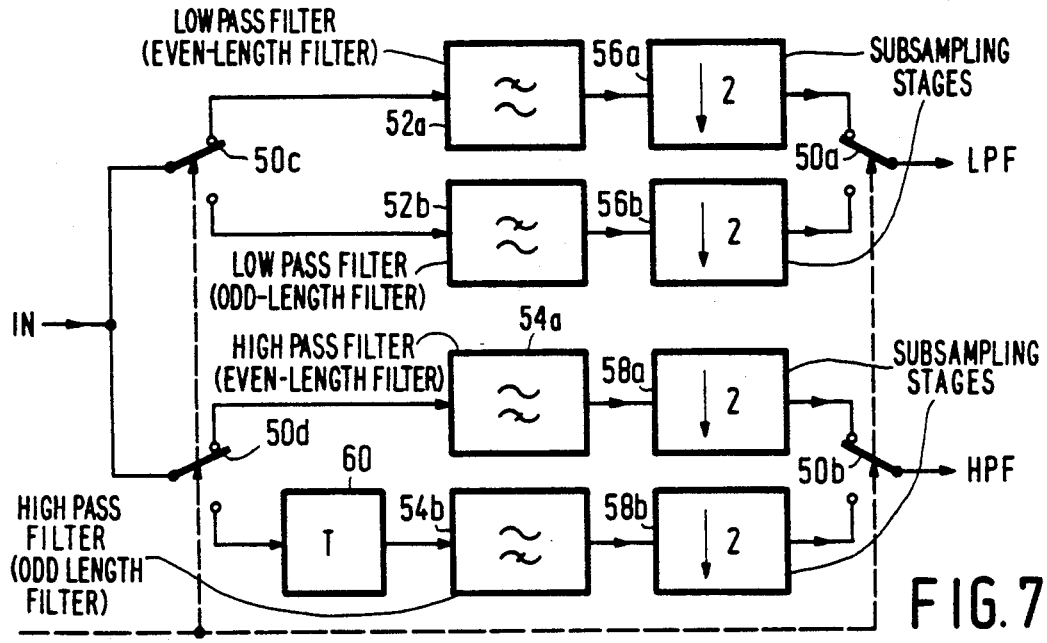
FIG. 7 is a more detailed block diagram of the vertical filter and subsampling unit of the present invention.

The vertical filter and subsampling units of FIG. 2 are shown in FIG. 7 in greater detail, including the filter implementing the above-described process. Since the two units are identical, only one is pictured and described. It will be noted that one difference between the circuits of FIG. 4 (horizontal filter) and those of FIG. 7 are that in the vertical filtering arrangement, the low-pass filter and the high-pass filter have been divided into two sections each, one section containing a QMF filter of even-length, the other a QMF of odd-length. Thus, a low-pass section 52a contains an even-length filter, while low-pass section 52b contains the odd-length filter. Similarly, the high-pass filter consists of an even-length filter section 54a and an odd-length filter section 54b. The outputs of filters 52a and 52b are combined by a switch 50a after subsampling in stages 56a and 56b respectively, those of filters 54a and 54b by a switch 50b after subsampling in stages 58a and 58b, respectively.

The input of filter 52a and that of 52b are connected to the output of memory 19 (FIG. 2) during respective ones of the fields constituting a frame via switch 50c. Similarly, the output of memory 26 (FIG. 2) is connected alternately to even-length QMF filter 54a and odd-length filter 54b by a switch 50d. All switches 50 operate under control of the vertical synchronization signals at the output of odd/even field detector 15 (FIG. 2).

Figure 8:
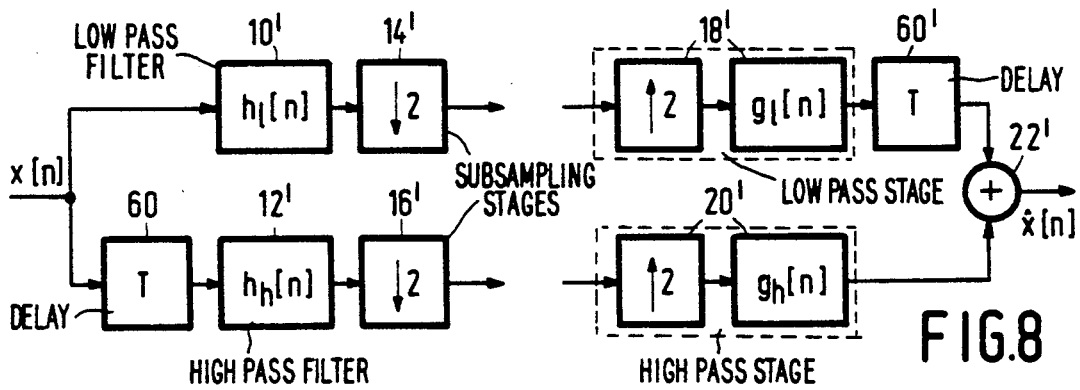
FIG. 8 is a block diagram illustrating an odd-length QMF splitting and reconstruction unit.

Another difference between the filter and subsampling units of FIG. 7 and those of FIG. 4 is the presence of a delay 60 in front of the high-pass filter 54b, namely the odd-length high-pass filter. The reason for this delay, which corresponds to a time between corresponding points on two sequential lines of a field, i.e. a one sample delay, is explained with reference to FIG. 8. In FIG. 8, the filtering and subsampling scheme at the signal originating end, as well as the upsampling and filtering scheme during reconstruction previously shown in FIG. 1 is repeated. However, while FIG. 1 illustrated the use of even-length filters at both the splitting and reconstruction end, in FIG. 8 all filters are odd-length filters. As shown mathematically in "New Quadrature Mirror Filter Structures" by C. Galand and H. Nussbaumer, IEEE Transactions on Acoustics; Speech, and Signal Processing, Vol. 32 No. 3, Jun. 1984, to effect proper reconstruction utilizing an odd-length filter, it is necesasary to insert a delay on the high-frequency side in the splitting operation, and the same delay on the low-frequency side in the reconstruction operation. Thus delay 60 in 60 in FIG. 7 is a one sample delay preceding the high-pass odd-length filter on the signal splitting side. A corresponding filter of the same delay will be introduced on the reconstruction side, as will be discussed below with reference to FIG. 10. It will be noted that there is no delay introduced to either signal path switched by switch 50a, the output of which constitutes the interlaced television signal with lower definition. Further, the output of switch 50a is stored in memory 23 (FIG. 2) while the output of switch 50b is stored in memory 24. The output of similar switches at the output of vertical filtering and subsampling stage 28 (FIG. 2) will be stored in memories 30 and 32.

Figure 9:
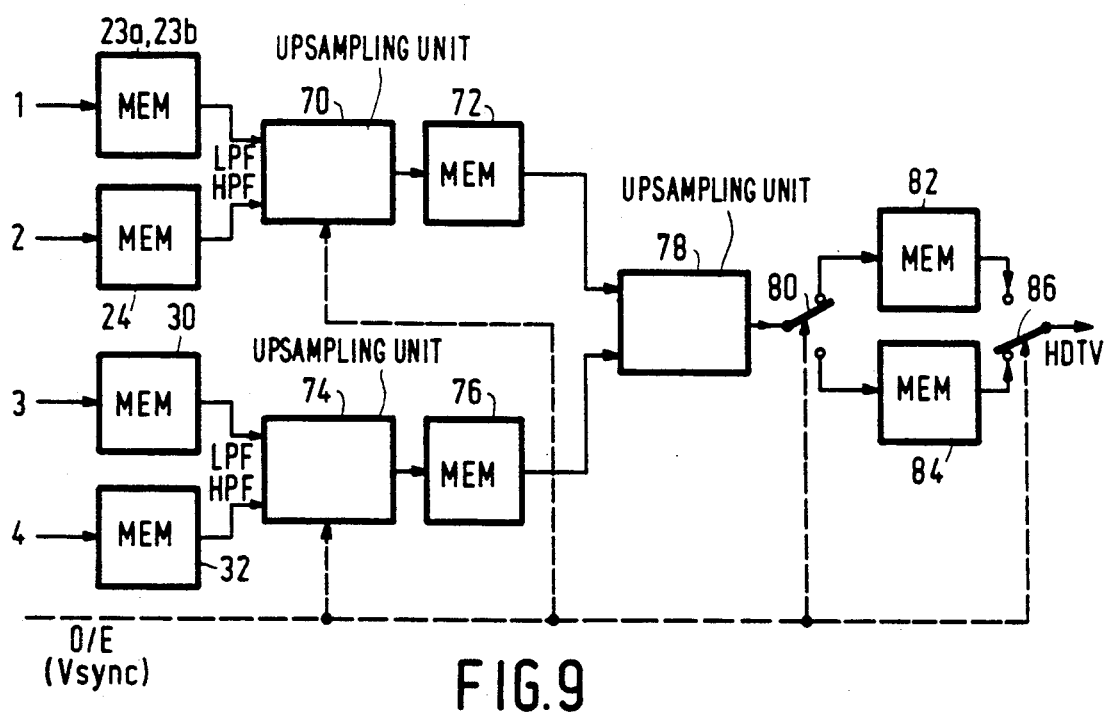
FIG. 9 is a block diagram of the reconstruction apparatus of the present invention.

FIG. 9 shows the basic blocks for reconstruction. Elements which are the same as those in other figures have the same reference numerals. Thus memories 23 and 24 furnish information to a vertical reconstruction and upsampling unit 70 whose output is in turn stored in a memory 72. Similarly, memories 30 and 32 supply the information for vertical reconstruction and upsampling unit 74, whose output is stored in a memory 76. The contents of memories 72 and 76 are read by a horizontal reconstruction and upsampling unit 78. The outputs of unit 78 are applied via a switch 80 to respective field memories 82 and 84. The latter store the odd and even field, respectively, of the reconstructed high-definition television signal available at the output of a switch 86. The timing throughout is controlled by odd/even vertical synchronization pulses. It should also be noted that reconstruction takes place in inverse order to the splitting operation, i.e. vertical reconstruction and upsampling precedes the horizontal reconstruction and upsampling.

Figure 10:
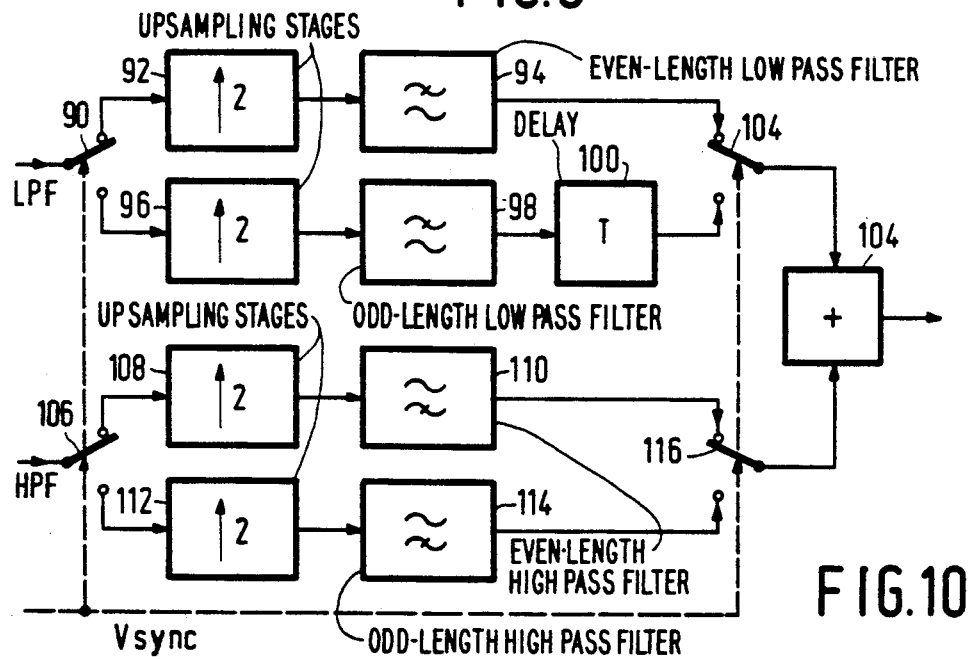
FIG. 10 is a more detailed block diagram of the vertical reconstruction and upsampling unit of FIG. 9.

The vertical reconstruction and upsampling unit is shown in greater detail in FIG. 10. A switch 90 provides data stored in memory 23 during the time switch 50a was in the upward position, i.e. connected to the output of an even-length filter, to an upsampling stage 92 followed by an even-length low-pass filter 94. Data entered when switch 50a was in the lower position, i.e. when the output of a low-pass filter having an odd-length was applied to memory 23, is applied to an upsampling stage 96 followed by a low-pass odd-length filter 98 when switch 90 is in the lower position (not illustrated). A one-sample delay 100 is connected to the output of low-pass filter 98. A switch 102 alternately connects the output of low-pass filter 94 and that of delay 100 to one input of a summing circuit 104.

A switch 106 operates in synchronism with switch 90 to apply information stored in memory 24 when switch 50b was in the upward position to an upsampling stage 108. Upsampling stage 108 is followed by a high-pass even-length filter 110. When switch 106 is in the lower position, information stored in memory 24 when switch 50b was in the lower position (i.e. samples which were low-pass filtered in the horizontal direction and high-pass filtered vertically) are applied to an upsampling stage 112 whose output is connected to a high-pass odd-length filter 114. These samples have a one-sample delay introduced by delay 60 (FIG. 7) which must be preserved during readout.

The output of high-pass filter 110 and that of high-pass filter 114 are alternately applied to the second input of summing circuit 104 by the action of a switch 116. Switches 90, 106, 102 and 116 also operate under the control of vertical synchronization signals, odd/even field information corresponding to that at the splitting end. It will be noted that the signals supplied to summing stage 104 when switches 102 and 116 are in the lower position have the correct phase relative to one another since the delay of unit 100 is balanced by the delay of unit 60 of FIG. 7. The delay of samples read from filters 98 and 114 relative to those read from filters 94 and 110 is accommodated either by an additional delay of one sample interconnected between filters 94 and 110 on the one hand and switches 102 and 116 on the other hand, or by adjustment of the timing of the readout from different sections of memory 72 into which the output of summing circuit 104 is entered.

Figure 11:
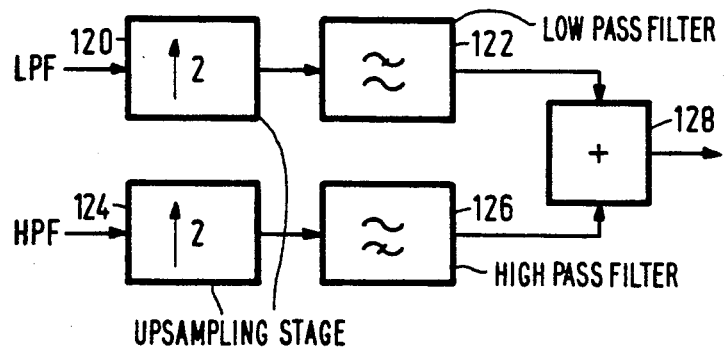
FIG. 11 is a more detailed block diagram of the horizontal reconstruction and upsampling unit of FIG. 9.

As mentioned above, the structure and operation of the vertical reconstruction and upsampling unit 74 is identical to that shown in FIG. 10 for upsampling unit 70 and will therefore not be illustrated or described again. The output of memory 72, which consists of samples which have been vertically reconstructed but still require horizontal reconstruction from previous low-pass filtering, as well as the samples from memory 76 which have also been vertically reconstructed but require high-pass horizontal reconstruction, are both applied to horizontal restructuring unit 78 which is illustrated in greater detail in FIG. 11. The output of memory 72 is applied to an upsampling stage 120 which is followed by a low-pass filter 122. Similarly, the output of memory 76 is applied to an upsampling stage 124 whose output is applied to high-pass filter 126. The outputs of filters 122 and 126 are applied to a first and second input, respectively, of the summing stage 128. The output of summing stage 128 is applied alternately to a field memory 82 and a field memory 84 (FIG. 9). These two field memories store the fields of the reconstructed high-definition television signal.

It should be noted again that the memories indicated throughout are not necessarily full field memories and in some cases would, at their maximum, be substantially less. Thus memories 11 and 13, while at the most field memories, could well be implemented as 2-line memories. Memories 19 and 26 must each, at the most, be capable of storing one half of a field. The minimum number of lines they would be required to store would depend on the particular vertical splitting scheme which will be discussed below. Memories 23, 24, 30 and 32 would, at the most, have to be able to store, each, one quarter of the samples of a field. The exact size of the memories required depends upon the complexity of the timing of the writing into and readout from the memories. The design of such circuits is well-known in the art and will not be discussed in detail here.

For the actual filter design, the main requirements are of course that the reconstructed high-definition television signal be, visually, the equivalent of the original high-definition television signal and that the interlaced television signal, i.e. the signal with a reduced definition derived from the HDTV signal, be of sufficiently high quality to result in acceptable pictures when played on present day television monitors.

To meet these requirements, it is important that the low-pass filter in the splitting unit have a linear phase. This requires a symmetrical FIR filter or, for the preferred embodiment of the present invention, a QMF filter of even length. Where use of an odd-length filter is required for the reasons mentioned above with respect to interlacing, the even-length and odd-length filters should have substantially the same frequency response.

Since it is known that filters with a large overshoot generally give low-quality television signals, it is important to design the filters such that their step response does not have a large overshoot.

For realtime implementation of FIR filters it is important to limit the complexity in terms of multipliers and finite precision calculation. Each output sample of a filter consists of a summation of a group of input samples, each of which is multiplied by a coefficient. Therefore every different filter coefficient value requires an extra multiplier in a high-speed implementation. Finally, each output sample of the filter is normalized to the range of the input signal. This requires an additional multiplication. Use of multipliers can be minimized by use of coefficients equal to a power of two. This allows shifting to replace the multiplication process.

Filters found by computer simulation based on the above requirements which yielded the best results are:

| length | coefficients | sum |
|---|---|---|
| 9 | 2  −4  −7  36  74  36  −7  −4  2 | 128 |
| 10 | 1  0  −5  5  31  31  5  −5  0  1 | 64 |

Figure 12:
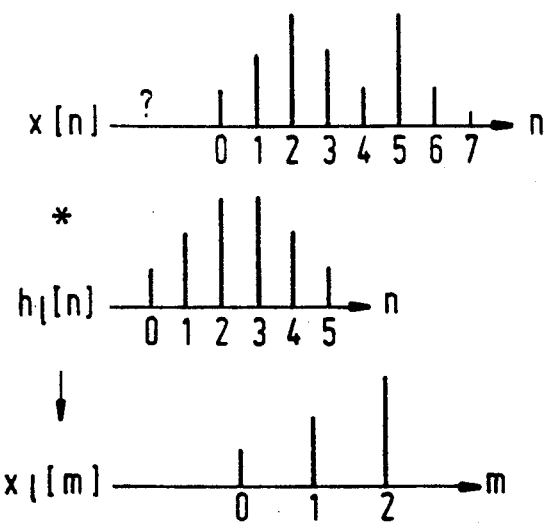
FIG. 12 is a timing diagram illustrating low-pass filtering near end of a line in even-length QMF.
Figure 14:
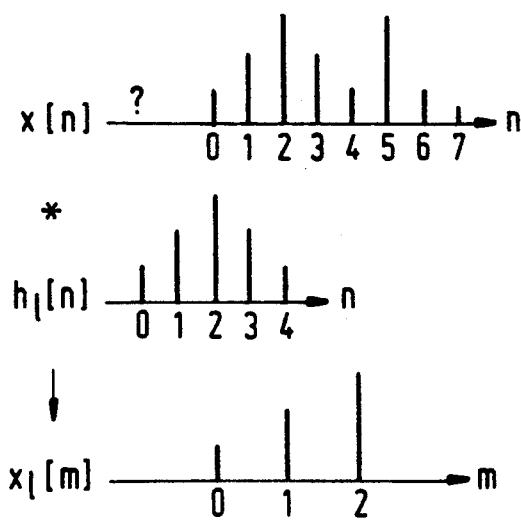
FIG. 14 is a timing diagram illustrating low-pass filtering near end of a line in odd-length QMF.

Another difficulty which arises in the splitting and reconstruction of the high-definition television image is that the lines or columns in the picture start and end abruptly. This creates an artefact near the borders in the reconstructed pictures unless measures are taken to "extend" the lines and columns. The problem is illustrated in FIG. 12. The top line in FIG. 12 shows the samples at the beginning of the line. They commence at a time of t=0. Below these samples, the impulse response of a low-pass symmetric filter with length 6 as illustrated. In order to compute the filter output illustrated in the last line of FIG. 12, the filter needs two additional samples, namely line samples indicated by ?? in the top line of FIG. 12 and signifying samples occurring before the start of the line which must be calculated before proper filtering can start. The situation with odd-length QMF filters is similar, as will be seen with reference to FIG. 14. Here the filter is of length 5 and again two samples before the start of the line are required to effect the proper filter response at the border. Filter lengths of 5 and 6 are used for illustrative purposes only. In practice, longer filters are used, as discussed above.

A similar problem occurs in the reconstruction unit and for the high-frequency signals. Before downsampling or upsampling the signals both in the line direction and in the column direction must be extended at the borders.

Figure 13:
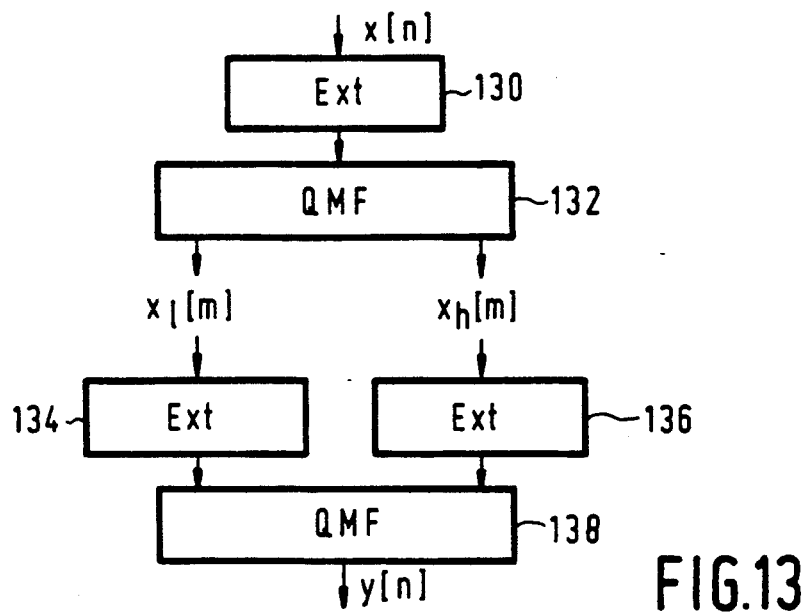
FIG. 13 is a block-diagram of the system of the present invention with line extension.

The required overall system is thus illustrated in FIG. 13. The lines and columns of the incoming digitized HDTV signal are extended in a stage 130 prior to quadrature-mirror filtering and subsampling in stage 132. On the reconstruction side, the low-frequency and high-frequency components of the original signal are each again extended both in the column direction and in the line direction in respective stages 134 and 136. Again, the extensions take place before the QMF reconstruction in stage 138.

The optimal extension for the original signal is one in which the missing samples outside of the borders of the signal can be unambiguously derived from the available samples inside the borders. This is true whether the filter is the high-frequency filter or the low-frequency filter. When this condition is satisfied, no artefacts are introduced into the reconstructed signal. Different methods for line extension are known and do not, per se, form part of this invention.

While the system and method of the present invention have been described with reference to a specific embodiment, variations will readily occur to one skilled in the art and are intended to be in contest in the following claims.

We claim:

1. An apparatus for digitally processing a high definition television signal comprising interlaced first and second fields for digital recording or other signal transmission, said television signal comprising a main number of samples per field and having a main frequency range, said apparatus comprising:
   (a) filter means for horizontally and vertically filtering said television signal so as to provide first, second, third and fourth auxiliary signals having first, second, third and fourth horizontal/vertical frequency ranges respectively which in combination comprise said main frequency range, said filter means comprising at least one filter having an even length for filtering said first field and at least one filter having an odd length for filtering said second field;
   (b) subsampling means coupled to said filter means, for subsampling said first, second, third and fourth auxiliary signals so as to provide first, second, third and fourth numbers of samples per field respectively, wherein the sum of said first, second, third and fourth numbers of samples per field does not exceed said main number of samples per field.

2. Apparatus as claimed in claim 1, wherein said filter means comprise quadrature-mirror filters.

3. Apparatus as claimed in claim 1, wherein the quadrature-mirror filters are finite impulse response filters.

4. Apparatus as claimed in claim 1, further comprising a delay element preceding said at least one odd-length filter.

5. Apparatus as claimed in claim 1, wherein the first auxiliary signal has a frequency range converting the low-frequency range in the horizontal and vertical directions, the first auxiliary signal constituting an interlaced television signal having a decreased resolution relative to the high-definition television signal.

6. Apparatus as claimed in claim 1, wherein the high-definition television signal comprises a plurality of signal samples arranged in lines and columns;
further comprising means for computing additional line samples and additional column samples from the signal samples at least one end of each of the lines and columns.

7. Apparatus for reconstructing a high-definition television signals from said first, second, third and fourth auxiliary signals described in claim 1, comprising:
(a) vertical filter and upsampling means;
(b) horizontal filter and upsampling means; and
(c) means for connecting the vertical filter and upsampling means in cascade with the horizontal filter and unsampling means thereby forming a cascade circuit, the cascade circuit having an input for receiving the first, second, third and fourth auxiliary signals and an output furnishing the high-definition television signal.

8. Apparatus as claimed in claim 7, wherein the vertical and horizontal filter and upsampling means each comprises at least one low-pass quadrature-mirror filter and one high-pass quadrature-mirror filter.

9. Apparatus as claimed in claim 8, wherein the at least one low-pass and one high-pass quadrature-mirror filter in the vertical filter and upsampling means each comprises an even-length filter and an odd-length filter.

10. Apparatus as claimed in claim 9, further comprising a one-sample delay connected in series with the odd-length low-pass filter.

11. Apparatus as claimed in claim 7, wherein the vertical filter and upsampling means precede the horizontal filter and upsampling means in the direction of signal processing.

12. Apparatus as claimed in claim 7, wherein the first, second, third and fourth auxiliary signals each comprises signal samples arranged in lines and columns;
further comprising means for computing additional line and additional column samples from the signal samples at least one end of each of the lines and columns.

13. Apparatus as claimed in claim 4, wherein the first auxiliary signal has a frequency range covering the low-frequency range in the horizontal and vertical directions, the first auxiliary signal constituting an interlaced television signal having a decreased resolution relative to the high-definition television signal.

14. The apparatus of claim 4 wherein filter means comprises a horizontal filter and a plurality of vertical filters, and wherein:
(a) said vertical filters each comprise:
(i) a first low pass filter having an odd length;
(ii) a second low-pass filter having an even length;
(iii) a first high-pass filter having an odd length;
(iv) a second high-pass filter having an even length;
(v) switch means for coupling said first low-pass filter and said first high-pass filter to said horizontal filter during said first field, and said second low-pass filter and said second high-pass filter to said horizontal filter during said second field; and
(b) said subsampling means comprises first, second, third and fourth subsampling circuits coupled respectively to said first low-pass filter, said second low-pass filter, said first high-pass filter and said second high-pass filter, each of said subsampling circuits providing a subsampling factor of two.

15. Apparatus as claimed in claim 14, wherein the first auxiliary signal has a frequency range covering the low-frequency range in the horizontal and vertical directions, the first auxiliary signal constituting an interlaced television signal having a decreased resolution relative to the high-definition television signal.

* * * * *